United States Patent Office 3,277,096
Patented Oct. 4, 1966

3,277,096
PROCESS FOR THE PREPARATION OF AMINO-HALOGENO ISOQUINOLINES
Francis Johnson, Newton Lower Falls, Mass., assignor to The Dow Chemical Company, Midland, Mich., a corporation of Delaware
No Drawing. Filed May 3, 1963, Ser. No. 277,677
The portion of the term of the patent subsequent to July 2, 1980, has been disclaimed
9 Claims. (Cl. 260—286)

This invention relates to isoquinoline compounds and to a method of preparing such amino-halogenoisoquinoline compounds by means of a synthetic path, commencing with a carbon compound, such as a 2-cyanobenzyl cyanide and substituted variants thereof which are characterized by 2 of the carbon atoms between the cyano groups being part of an aromatic ring.

This application is continuation-in-part application of my application Serial No. 5,661, filed February 1, 1960, now issued as U.S. Patent No. 3,096,337 which disclosed and claimed a process for the preparation of amino-halogenopyridine compounds corresponding to the following:

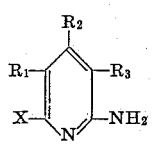

wherein X represents the halogen and $R_1$, $R_2$, $R_3$ represent any organic or inorganic radical.

The present invention relates to compounds conforming to this general formula in which $R_1$ and $R_2$, and $R_2$ and $R_3$ are part of an aromatic ring system corresponding to the following:

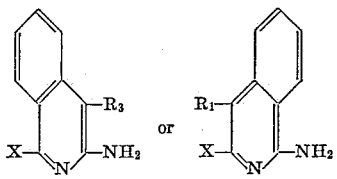

wherein $R_1$ and $R_3$ represent any organic or inorganic radical.

Accordingly, it is an object of this invention to provide a method of synthesizing amino-halogeno-isoquinoline derivatives.

Other objects and advantages of the invention will in part be obvious and in part appear hereinafter.

In accordance with this invention, therefore, the process is concerned with a method of preparing new amino-halogenoisoquinoline compounds from 2-cyanobenzyl cyanides and α-substituted 2-cyanobenzyl cyanides wherein the process involves, first, forming a 2-cyanobenzyl compound wherein the double bond is part of an aromatic ring system such as

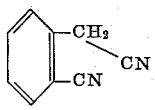

Thereafter reacting the 2-cyanobenzyl cyanide formed or an appropriately substituted version thereof, with an anhydrous halogen acid, either with or without the presence of a solvent, thereby producing amino-halogenoisoquinoline corresponding to the following:

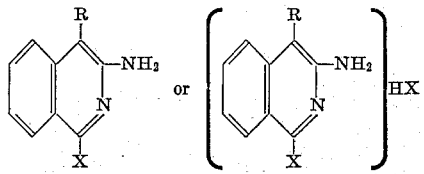

wherein R represents any organic or inorganic radical which is stable under the reaction conditions and X represents the halogen.

In the reaction forming the amino-halogenoisoquinoline, if it is desired to use a solvent the solvent must be one which does not participate in the reaction or react with the hydrogen halide used in the process.

The starting materials which include any compound having the basic structure, defined as follows, may be any compound containing the following:

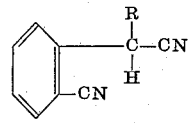

will carry in the R position any organic or inorganic radical such as a moiety selected from the group consisting of hydrogen, alkyl, phenyl and phenyl alkyl.

Thus raw materials for the reaction may be such organic compound and any acid HX, wherein X is a halogen.

As specific examples of the starting organic compound there may be mentioned.

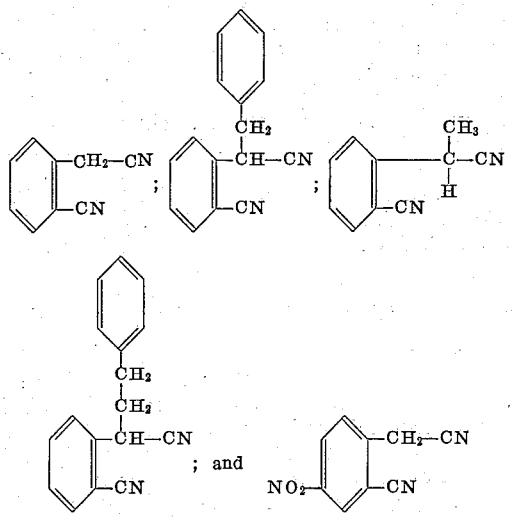

In general in carrying out the process the preferred range of temperature is from about −5° to 100° C., whereas the ratio of hydrogen halide to organic starting material should be at least 1:1.

Accordingly, it will be seen that the process is readily adaptable to the preparation of such compounds as substituted aminobromoalkylisoquinolines such, e.g., as 3-amino-1-bromo-4-benzylisoquinoline and others. In general those compounds which can be made according to the process may be represented by the following drawing:

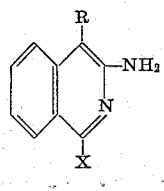

wherein the R radical corresponds to the R radical defined in connection with the specification of starting material.

It will be seen from the general drawing of the final product of reaction that the starting material is selected to orient a substituent R in a desired position, because the dinitrile system used for the formation of a material is traceable in the product of reaction by noting that the heterocyclic nitrogen atom in the cyclized hetero ring is one of the nitrogens of the starting material and the nitrogen atom in the amino group is the other nitrogen atom of the starting dicyano compound.

Reference to the following specific examples will more clearly illustrate the fundamental reaction involved in the formation of the compounds:

EXAMPLE I

Preparation of 3-amino-1-bromo-isoquinoline 2-cyanobenzylcyanide was suspended (or could be dissolved) in 10–20 times its weight of dry ethyl ether, and cooled in an ice bath. Dry hydrogen bromide was bubbled through the mixture for 30 minutes to 1 hour until precipitation of the hydrogen halide salt appeared complete. The total reaction mixture was poured into an excess of sodium hydrogen carbonate solution. The crude 3-amino-1-bromo isoquinoline was separated by filtration and subsequently recrystalized from methylene chloride-petroleum ether. This yielded 3-amino-1-bromo isoquinoline M.P. 153–4° C.

*Analysis.*—Calculated for $C_9H_2N_2Br$: C, 48.5; H, 3.2; N, 12.6; Br, 35.8. Found: C, 48.6; H, 3.4; N, 12.4; Br, 35.6.

EXAMPLE II

Preparation of 3-amino-1-iodoisoquinoline 2-cyanobenzyl cyanide was dissolved in 10–20 times its weight of glacial acetic acid. To this solution was added rapidly excess 13% hydrogen iodide in glacial acetic acid. A yellow precipitate appeared immediately. After one half hour it was removed by filtration and then put into sodium hydrogen carbonate solution. The crude 3-amino-1-iodoisoquinoline was separated by filtration and subsequently recrystallized from ether-petroleum ether. This yielded the 3-amino-1-iodoisoquinoline M.P. 147–8° C.

*Analysis.*—Calculated for $C_9H_8N_2I$: C, 40.0; H, 2.6; N, 10.4; I, 47.0. Found: C, 40.2; H, 2.6; N, 10.3; I, 47.2.

EXAMPLE III

Preparation of 3-amino-1-bromo-4-benzylisoquinoline

α-Benzyl-2-cyanobenzyl cyanide was dissolved in 10–20 times its weight of dry ethyl ether and cooled in an ice bath. Dry hydrogen bromide was bubbled through the mixture for two and one half hours (precipitation of the hydrogen halide salt began to occur after one half hour). At the end of the time the entire reaction mixture was poured into an excess of sodium hydrogen carbonate solution. The crude 3-amino-1-bromo-4-benzylisoquinoline was removed by filtration and subsequently recrystallized from methylenechloride-petroleum ether. The product had an M.P. of 161–2° C.

*Analysis.*—Calculated for $C_{16}H_{13}N_2Br$: C, 61.4; H, 4.2; N, 8.9; Br, 25.5. Found: C, 61.2; H, 4.1; N, 8.9; Br, 25.5.

EXAMPLE IV

Preparation of 3-amino-1-iodo-4-benzylisoquinoline

α-Benzyl-2-cyanobenzyl cyanide was dissolved in 10–20 times its weight of glacial acetic acid. Then an excess of 13% hydrogen iodide in glacial acetic acid was added dropwise with stirring. A yellow solid precipitated immediately but stirring was continued for one half hour. The hydrogen halide salt was removed by filtration and treated with sodium hydrogen carbonate solution. The crude 3-amino-1-iodo-4-benzylisoquinoline was separated by filtration and subsequently recrystallized from methylene chloride-petroleum ether. This gave a 52% yield of the product which melted at 175–6° C.

*Analysis.*—Calculated for $C_{16}H_{13}N_2I$: C, 53.3; H, 3.6; N, 7.8; I, 35.3. Found: C, 53.7; H, 3.7; N, 7.8; I, 35.1.

It is of course to be understood that 2-cyanobenzyl starting materials having substitutions in the benzene ring are utilized in preparing the isoquinolines of my invention. The following is exemplary:

EXAMPLE V

Preparation of 1-bromo-3-amino-7-nitroisoquinoline

To a solution of 2-cyano-4-nitrobenzyl cyanide (1.6 g.) dissolved in acetic acid was added with stirring 30% hydrogen bromide in acetic acid (excess). After stirring for 60 hours at room temperature, the reaction mixture was poured into a solution of dilute sodium acetate. The resulting dark red needles were removed by filtration (1.8 g.). Recrystallization from large volumes of ethanol afforded the pure material, M.P. 225–230° C. (sintering), whose infrared spectrum had characteristic —$NH_2$ absorption at 2.91, 3.02, and 3.13 μ and nitro bands at 6.40 and 750μ.

*Analysis.*—Calculated for $C_9H_6BrN_3O_2$: C, 40.3; H, 2.3; Br, 29.8; N, 15.7. Found: C, 40.1; H, 2.1; Br, 29.8; N, 15.8.

EXAMPLE VI

Hydrobromide salts

The 3-amino-1-bromoisoquinoline of Example I and 3-amino-1-bromo-4-benzylisoquinoline of Example III were crystallized as their hydrobromide salts from an aqueous solution containing hydrogen bromide.

EXAMPLE VII

Tydroiodide salts

The 3-amino-1-iodoisoquinoline of Example II and 3-amino-1-iodo-4-benzylisoquinoline were crystallized as their hydroiodide salts from an aqueous solution containing hydrogen iodide.

Other 3-amino-1 halo-4 alkyl isoquinolines are prepared by the procedures shown in Examples 3 and 4.

The method described in this patent application for the preparation of isoquinoline compounds functionally substituted in the hetero-ring present many advantages over conventional methods. Recently reported methods, unrelated to the method described in this patent application, require a lengthy and tedious process. These methods suffer from the disadvantages of limited availability of starting materials and long unwiedly synthetic paths. The present invention differs from the known art in being an entirely new method whereby one can synthesize an isoquinoline derivative. It also has the advantage over the known art in that 3-aminoisoquinolines previously available by a multi-step procedure can now be prepared efficiently by a one-step method starting with 2-cyanobenzyl cyanide and substituted 2-cyanobenzyl cyanides.

Biological activity of the compounds shows up in activity against bacteria and insects, as well as in plant control. The biological activity is specific to certain areas. Thus, for control of certain bacteria, certain compounds are useful; also for control of parasites and insects, others may be used; and, finally, certain other compounds are useful in plant control. These observations may be summarized as follows:

3-amino-1-iodo isoquinoline—saturated solution inhibits staphylcoccus aurus and shows anticoagulant activity on clot lysis.

3-amino-1-bromo-7-nitro isoquinoline—gives 55 percent control of nitrification bacteria at 5 p.p.m.

3-amino-1-bromo isoquinoline—in 0.06 percent concentration gives 28 percent control of mouse trichostrongylid and 100 percent control of mouse tapeworm.

3-amino-1-iodo isoquinoline—at 500 p.p.m. gave 40 percent control of plum curculio.

3-amino-4-benzyl-1-bromo isoquinoline—at 1 p.p.m. gave 50 percent control of Northern fat-headed minnow.

3-amino-1-bromo-4-phenethyl isoquinoline—at 1 p.p.m. gave 50 percent control of Northern fat-headed minnow; 4 pounds per 1000 cubic feet gives 50 percent control of tomato and 40 percent control of beans; 100 p.p.m. gives 25 percent control of pigweed and 25 percent control of crabgrass.

3-amino-1-bromo-4-methyl isoquinoline—at 500 p.p.m. gives 80 percent control of Southern army worm and 70 percent control two-spotted spider mite; at 10 p.p.m. gives 25 percent control of Cabomba waterplant and 25 percent control of coontail waterplant; and at 4 pounds per 1000 cubic feet gives 10 percent control of tomato and 40 percent control of bean.

3-amino-1-bromo-4-ethyl isoquinoline—gives 50 percent control of Northern fat-headed minnow at 1 p.p.m. and 40 percent control of pigweeds at 100 p.p.m.

The compounds thus synthesized are useful as brighteners in nickel plating baths. The standard nickel plating bath is generally a nickel chloride solution maintained at an acid pH which includes a combination of several compounds for inducing the production of mirror bright nickel plates. The compounds can be used directly as such; as their halide acid salts; or, quite frequently, they are quaternized with various alkyl halides to form the brightening composition.

Though the invention has been described in reference to only a limited number of examples, it is to be noted that variants thereof may be practiced without departing from its spirit or scope.

What is claimed is:

1. A process for the preparation of compound of the formula

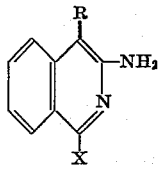

wherein R is a member selected from the group consisting of hydrogen, alkyl, phenyl and phenyl alkyl and X is a halogen selected from the group consisting of bromine and iodine, which process comprises reacting in an inert organic solvent at room temperature a compound selected from the group consisting of

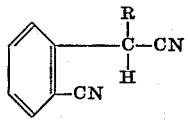

wherein R has the same meaning as above, with an anhydrous halide of the formula HX where X has the same meaning as above and thereafter recovering said first-named compound.

2. The method in accordance with claim 1 in which the starting material is

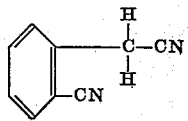

3. The method in accordance with claim 1 in which the starting material is

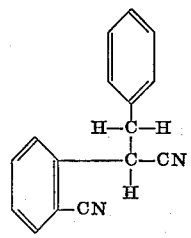

4. The method in accordance with claim 1 in which the starting material is

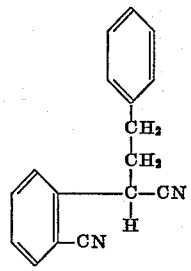

5. The method in accordance with claim 1 in which the starting material is

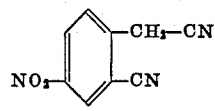

6. The hydroiodide salt of 3-amino-1-iodoisoquinoline prepared by crystallizing said hydroiodide salt from an aqueous solution containing hydrogen iodide and said isoquinoline.

7. The hydrobromide salt of 3-amino-1-bromo-4-benzylisoquinoline prepared by crystallizing said hydrobromide salt from an aqueous solution containing hydrogen bromide and said isoquinoline.

8. The hydroiodide salt of 3-amino-1-iodo-4-benzylisoquinoline prepared by crystallizing said hydroiodide salt from an aqueous solution containing hydrogen iodide and said isoquinoline.

9. The hydrobromide salt of 3-amino-1-bromo-isoquinoline prepared by crystallizing said hydrobromide salt from an aqueous solution containing hydrogen bromide and said isoquinoline.

References Cited by the Examiner

UNITED STATES PATENTS 3,002,001  9/1961  Surrey _____ 260—288
3,096,337  7/1963  Johnson _____ 260—288 XR

OTHER REFERENCES

Baker et al.: "J. Am. Chem. Soc.," vol. 69, p. 704 (1947).

ALEX MAZEL, *Primary Examiner.*

DON M. KERR, DONALD G. DAUS,
*Assistant Examiners.*